United States Patent
Sahim et al.

(10) Patent No.: US 7,400,886 B2
(45) Date of Patent: Jul. 15, 2008

(54) CALL HAND-OVER IN A WIRELESS LOCAL AREA NETWORK

(75) Inventors: Faramarz Sahim, Boca Raton, FL (US);
Nissim J. Ozery, Parkland, FL (US);
Mallikarjuna Samayamantry, Boca Raton, FL (US); Nigel Trueman, Boca Raton, FL (US)

(73) Assignee: Siemens Communications, Inc., Boca Raton, FL (US)

( * ) Notice: Subject to any disclaimer, the term of this patent is extended or adjusted under 35 U.S.C. 154(b) by 211 days.

(21) Appl. No.: 10/755,065

(22) Filed: Jan. 9, 2004

(65) Prior Publication Data

US 2005/0153698 A1 Jul. 14, 2005

(51) Int. Cl.
*H04Q 7/20* (2006.01)

(52) U.S. Cl. ......... 455/444; 455/436; 455/437

(58) Field of Classification Search ........ 455/444, 455/436, 442, 432.1
See application file for complete search history.

(56) References Cited

U.S. PATENT DOCUMENTS

| | | | | |
|---|---|---|---|---|
| 5,668,862 A | * | 9/1997 | Bannister et al. ....... | 379/207.14 |
| 6,112,088 A | * | 8/2000 | Haartsen ................. | 455/437 |
| 6,327,470 B1 | * | 12/2001 | Ostling .................... | 455/437 |
| 6,584,316 B1 | * | 6/2003 | Akhteruzzaman et al. ... | 455/445 |
| 2002/0085516 A1 | | 7/2002 | Bridgelall .................. | 370/329 |
| 2004/0264410 A1 | * | 12/2004 | Sagi et al. ................ | 370/331 |

FOREIGN PATENT DOCUMENTS

| EP | 0 700 227 | 6/1996 |
|---|---|---|
| WO | WO 94/29992 | 12/1994 |

OTHER PUBLICATIONS

Zhang et al., "Efficient Mobility Management for Vertical Handoff Between WWAN and WLAN", IEEE Communications Magazine, IEEE Service Center, Piscataway, NJ, vol. 41, No. 11, Nov. 2003, pp. 102-108.

Liao et al., "VoIP Mobility In IP/Cellular Network Internetworking", IEEE Communications Magazine, IEEE Service Center, Piscataway, NJ, vol. 38, No. 4, Apr. 2000, pp. 70-75.

* cited by examiner

*Primary Examiner*—Erika A. Gary

(57) ABSTRACT

A method and apparatus for automatically handing over calls between a wireless LAN and a non-WLAN, with minimum or no disruption of active calls. The invention gives users flexibility in customizing hand-over preferences and allows telephony features to be transferred during the hand-over.

35 Claims, 3 Drawing Sheets

CALL HAND-OVER IN A WIRELESS LOCAL AREA NETWORK

FIELD OF THE INVENTION

The present invention relates generally to wireless Local Area Networks (WLAN), and specifically, to a method and an apparatus for automatically handing over calls between a WLAN and a non-WLAN.

BACKGROUND OF THE INVENTION

Wireless Local Area Networks, or Wi-Fi networks (e.g., IEEE 802.11b), are ideal for extending the reach of local area networks to accommodate the increased mobility of users. Using a WLAN, users throughout the WLAN coverage area can connect to the corporate data network using a Personal Computer (PC) incorporating a wireless LAN card. Furthermore, WLANs allow users to make and receive voice calls using WLAN enabled Personal Digital Assistance (PDAs) or other Wi-Fi enabled devices. The use of WLAN or Wi-Fi networks to carry Voice over Internet Protocol (VoIP) traffic is gaining popularity such that some WLANs are being installed as dedicated networks for voice traffic. This capability is appealing since it allows users to make and receive wireless calls within the coverage area of the WLAN without incurring cellular telephone charges. Campuses, airports, hotels, for example, and other public places are well suited to WLAN implementations.

The benefit of a WLAN is limited by the constraints of the coverage area of that WLAN. As users leave the coverage area, WLAN calls are disconnected. This limitation has been addressed previously by Siemens' HiPath CorporateConnect feature, in which users may, on-demand, hand-over (i.e. transfer) a WLAN call from the wireless device to a cellular device. According to know methods, when a user decides to hand-over a call to a target device, the user enters a hand-over access code followed by the telephone number of the target device. Consequently, the target device is dialed and the call is connected to that target device upon answering the incoming call.

However, know techniques require the user to actively request the hand-over and determine when the hand-over should occur. Typically it is difficult for the user to accurately evaluate the received WLAN signal strength or the quality of the IP connection in order to determine the optimal time and physical location for handing over the call.

SUMMARY AND OBJECTS OF THE INVENTION

The foregoing and other problems and deficiencies in the prior art are overcome by the present invention, which provides a method and an apparatus for automatically handing over calls between a WLAN device and a non-WLAN device (e.g. cellular or wireline device) and/or vice versa. The present invention allows WLAN callers to continue their calls with minimum or no disruption when roaming outside the WLAN coverage area or encountering "dead spots" between WLANs.

Since the invention allows an optimal utilization of e.g., a corporate WLAN network, callers are likely to save on cellular access charges as a result of limiting the cellular telephone usage only to the time when the WLAN coverage is not available or not accessible.

Thus, it is an object of the present invention to automatically hand-over calls from a WLAN to a non-wireless LAN (e.g. cellular or wireline network).

It is also an object of the present invention to allow hand-overs of cellular calls to WLAN devices when entering the WLAN coverage area.

It is another object of the present invention to provide on-demand hand-overs between WLANs and non-WLANs.

It is a further object of the present invention to maintain active call connections while handing over calls between a WLAN and a non-WLAN.

It remains an object of the present invention to transfer telephony features from an originating device to a target device after the hand-over is performed.

It is also an object of the present invention to allow users to configure a personalized client setting for specifying hand-over targets and desired telephony features.

One aspect of the present invention is that it comprises a mobility server that connects voice call trunks, controls wireless LAN calls, dials the telephone number of the target device, allows users to customize hand-over options and permits telephony features to be transferred after the completion of the hand-over.

Another aspect of the present invention is that it provides a user interface to set the hand-over targets and telephony preferences using a Personal Computer or a dial up connection.

It is yet another aspect of the present invention that it recognizes loss of call connection to a WLAN and hands over the call to another device, as defined by user.

A further aspect of the present invention is that it provides an alert to the other call party indicating that a hand-over is in progress.

The foregoing objects are achieved and other features and advantages of the present invention will become more apparent in light of the following detailed description of exemplary embodiments thereof, as illustrated in the accompanying drawing, where:

DETAILED DESCRIPTION

Figure 1:
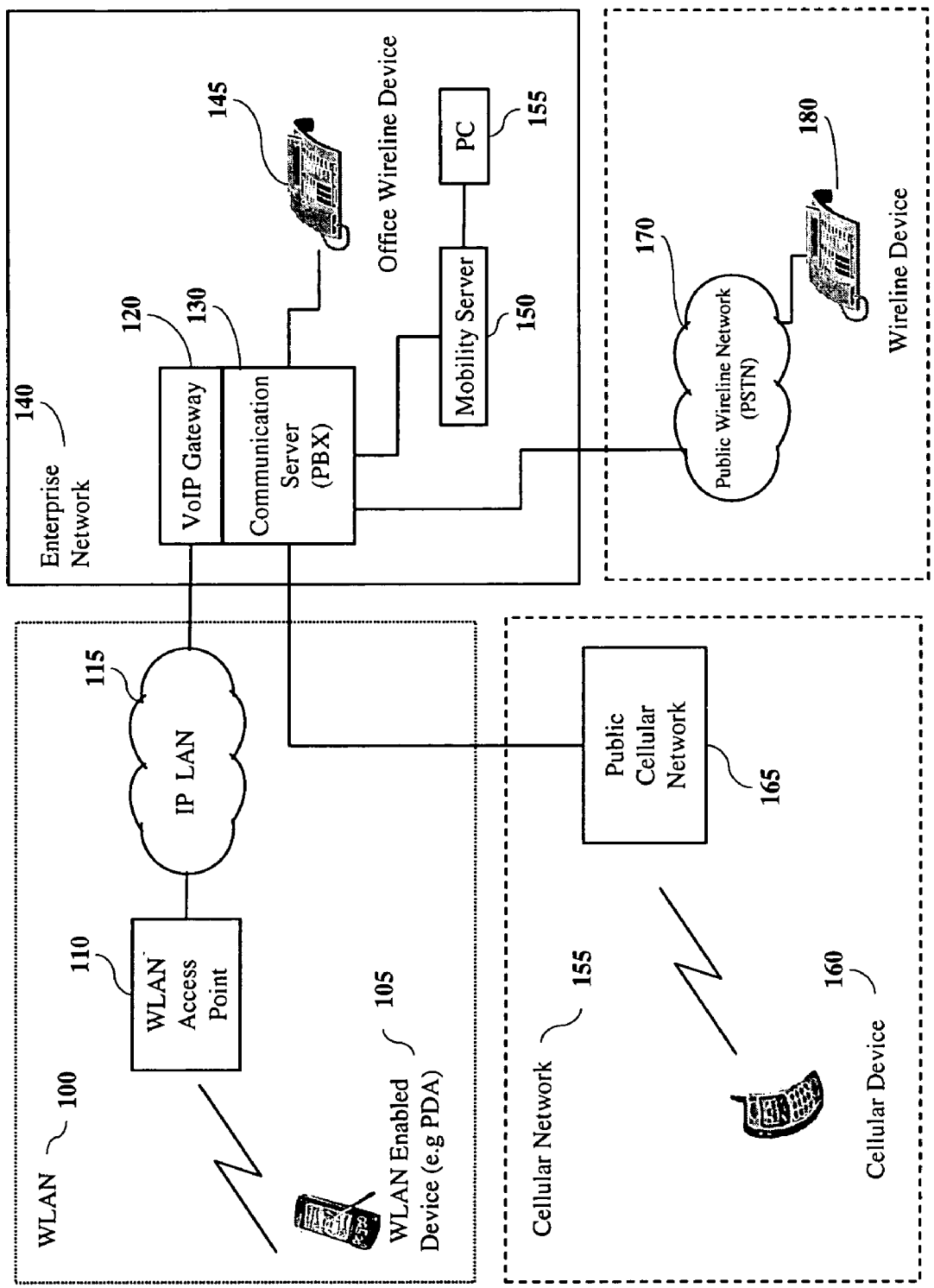
FIG. 1 is a schematic block diagram of network connectivity of a WLAN, an off-campus wireless network and an Enterprise Network connected to the Public System Telephone Network according to an illustrative embodiment of the present invention.

Generally, and as will be discussed in detail below with respect to FIG. 1, under the present invention, Voice over Internet Protocol (VoIP) calls are automatically handed over from a WLAN to a non-WLAN network as a result of leaving the WLAN coverage area and the accompanying loss of the enabling IP connection. Similarly, the invention allows cellular telephone calls to be handed over to WLAN enabled devices (e.g. PDAs) when entering the WLAN coverage area. Typically, the hand-over involves transferring the call to the appropriate telephonic device for the destination network. While the exemplary embodiment of the present invention focuses on hand-overs from a WLAN to a cellular network and vice versa, hand-overs to wireline telephone devices (e.g. analog office telephones, digital office telephones, cordless telephones) or other devices within the Enterprise Network are also possible. In alternative embodiments, hand-overs under the present invention can also be undertaken on demand. The cellular network referenced in the discussion of this invention encompasses any cellular or PCS frequency and is not limited by any specific transmission technology (e.g., TDMA, CDMA, GSM, UMTS, W-CDMA, etc.). Further, the WLAN network includes all versions of the applicable IEEE 802.11 standards.

The present invention allows users to specify a priori one or more target hand-over devices and a plurality of user profiles, such that when the trigger for a hand-over is present, the call is handed over to the target device and the desired telephony features and capabilities are transferred to the target device. The present invention allows the hand-over to the target device to occur with minimum or preferably no disruption to the voice call, and while maintaining the voice connection with other call participant or participants (in the case of a multi-party call). Additionally, the present invention gives users the option of halting the automatic hand-over feature or forcing a hand-over at any time. On demand (i.e. forced) hand-overs are initiated for an active call when the caller enters an access code and the telephone number of the target device. For example, forced hand-overs from a WLAN device to a cellular device are performed upon user request even if the data link for the WLAN call is not disconnected or if the Radio Frequency (RF) signal strength of the current WLAN call is still strong enough to maintain the call.

As mentioned, the present invention also allows users to designate several hand-over target devices (voice communication devices) and user preferences. These target devices may include one or more WLAN enabled PDAs, cellular telephones or office wireline devices. The hand-over targets and user preferences are stored at the mobility server database. Devices are identified in the database by their telephone numbers.

The invention will now be described in detail with reference to the accompanying drawing. FIG. 1 is a schematic block diagram of a WLAN associated with an Enterprise Network. While only a single WLAN is shown for purposes of illustration, the Enterprise Network can include several WLAN networks.

In FIG. 1, the WLAN 100 (e.g. Wi-Fi network) allows WLAN enabled devices (e.g. a PDA) 105 to access the IP LAN 115 via the WLAN Access Point 110. Thus the WLAN enabled device, e.g. PDA 105, is able to connect to the IP LAN 115 and can transmit and receive VoIP calls. Signaling and data messages for calls carried over the WLAN Network 100 are packetized and transmitted as packets over the IP LAN 115 using known techniques.

The IP LAN 115 is connected to the Enterprise Network 140 via the VoIP Gateway 120. The VoIP Gateway allows packetized voice to enter the Communication Server (i.e. PBX) 130. Alternatively, when employing an IP capable Communication Servers, VoIP Gateway 120 is not required and the packetized voice is connected directly from the IP LAN 115 to the Communication Server 130. Many telephone devices, such as Office Wireline Device 145, are typically associated with the Communication Server 130.

According to the present invention, Mobility Server 150 is connected to the Communication Server 130. The Mobility Server 150 comprises hardware that extends the trunk connectivity of the WLAN network users from the Communication Server 130 to the Mobility Server 150. Mobility Server 150 hardware comprises a plurality of Digital Signal Processors (DSP) that are used in conjunction with the software to monitor and connect voice calls. The Mobility Server 150 also hosts software applications that track and monitor the status of the associated mobile callers. The Mobility Server software performs call control and management functions, e.g., gathers information about the status of the calls within the WLAN network and the device preferences for every user.

The Mobility Server 150 provides an interface that allows each user to enter their preferred hand-over settings and device preferences. Users can initiate a session to view or change settings using PC 155 or a dial-up connection (not shown). These settings can include target hand-over devices, thresholds for hand-overs, access codes, features to be transferred and notification preferences or the like. The Mobility Server 150 utilizes the user-specified information to control the hand-over process and execute user preferences when the hand-over threshold is triggered.

The present invention can allow users to create multiple profiles and associate these profiles with user devices (e.g. an out-of-office profile can specify a cell telephone target device and a list of features that are typically useful for such device). The caller can change telephony features while the call is active, by selecting a different or an additional feature using a PDA or using a pre-defined access code for the desired feature via DTMF (e.g. pressing the star key twice followed by the feature activation code).

The Mobility Server 150 is connected to the Communication Server 130 using, e.g., multiple DS0 or T1 trunks. Typically, the number of trunks used is engineered such that WLAN calls can attain the desired Quality of Service. According to the exemplary embodiment of FIG. 1, control trunks (data links) between the Communication Server 130 and the Mobility Server 150 are separate from the voice traffic trunks. Ingress voice trunks are also separate from the egress trunks.

According to the exemplary embodiment of FIG. 1, Mobility Server 150 is shown as a separate unit from the Communication Server 130. In another embodiment, the Communication Server 130 and the Mobility Server 150 can be integrated as a single unit. Furthermore, the present invention allows the VoIP Gateway 120 to be either separated or integrated with both the Communication Server 130 and the Mobility Server 150.

The Communication Server 130 in FIG. 1 is also connected to a Public Cellular Network 165, which typically comprises a plurality of base stations (not shown). Cellular terminals such as Cellular Device 160 are then able to communicate with other devices within the Public Cellular Network 165, or outside that network, through the connection to the Communication Server 130. The connection of the Communication Server 130 to the Public Wireline Network 170 (i.e. PSTN) links the WLAN 100 to the Public Wireline Network 170 and to the Public Cellular Network 165. Other Enterprise Networks can also be connected to the Public Wireline Network 170. Through its connection to the Public Wireline Network 170, Wireline Device 180 is able to make and receive calls from other devices throughout the public network.

Figure 2:
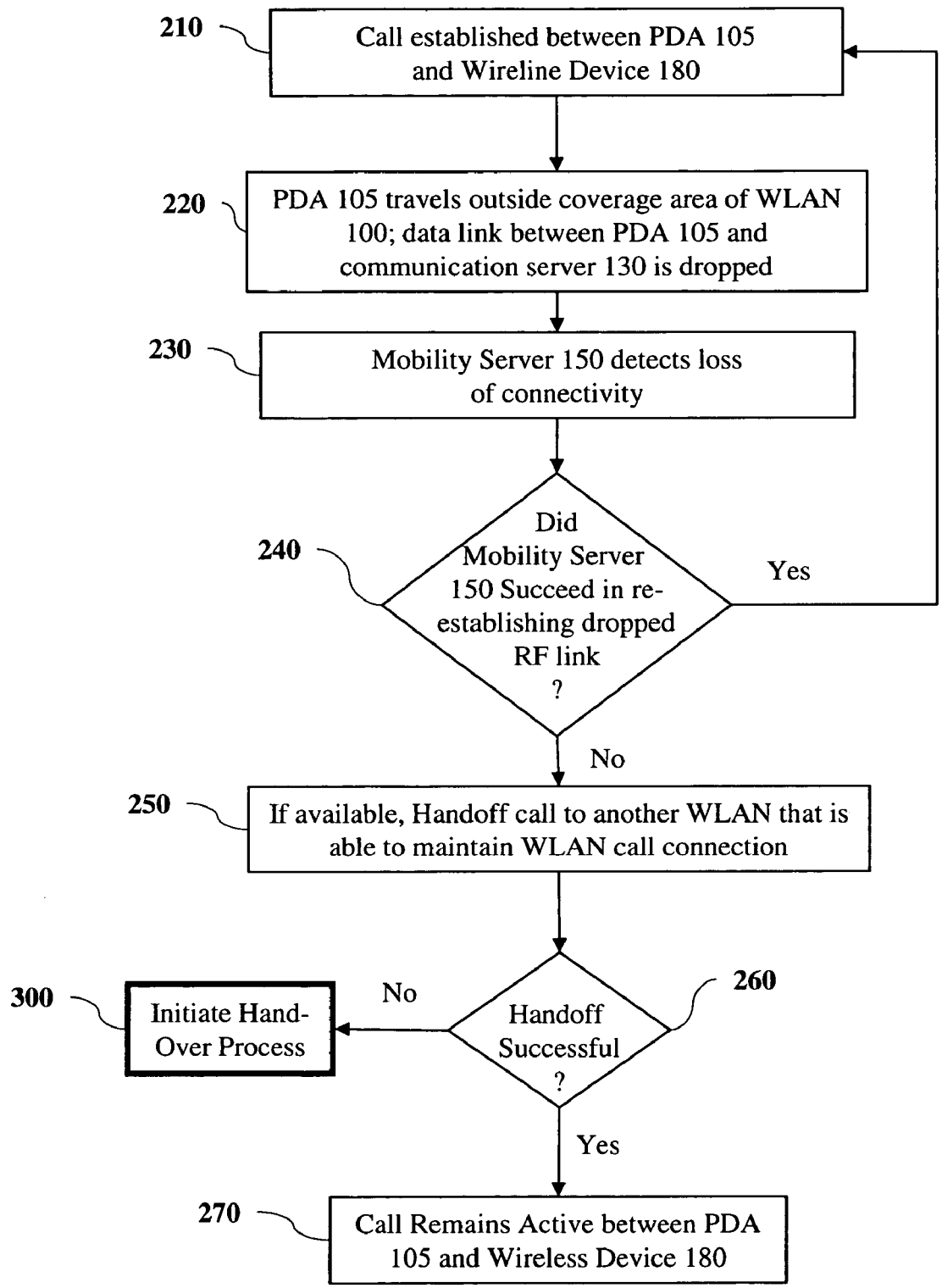
FIG. 2 is a flow chart showing an exemplary handoff of a WLAN call between two or more WLAN networks according to an illustrative embodiment of the present invention.

FIG. 2 shows an illustrative flow diagram of the handoff process of a WLAN call between two WLAN coverage areas. As shown in FIG. 2, WLAN enabled device users (e.g. users of PDA 105) who receive or initiate calls on the WLAN network 100 are able to communicate with other telephonic devices (e.g. cellular device 160, office wireline device 145 or wireline device 180) and maintain the WLAN call connection while in the WLAN coverage area. The handoff process starts in step 210, in which a call is established, e.g. between PDA 105 and a Wireline Device 180. When a WLAN caller travels outside the bounds of the WLAN coverage area in step 220, the RF signal strength of the WLAN call will diminish, thus causing the call IP connectivity to be lost and the data link between the PDA 105 and the Communication Server 130 to drop.

Since the present invention provides additional trunk connectivity for WLAN callers between the Communication Server 130 and the Mobility Server 150, the connection of the other party (e.g. Wireline Device 180) to the Mobility Server 150 remains intact even after the loss of the IP connection with the PDA 105. According to the present invention, when the Mobility Server 150 detects the loss of the data link in step 230, first it attempts to prevent the call from being disconnected by attempting to re-establish the dropped RF link at PDA 105. If the Mobility Server 150 succeeds in re-establishing the dropped RF link in step 240, the call connection remains established as indicated in step 210. However, if re-establishing the call in step 240 is not possible, then in step 250 the Mobility Server attempts to handoff the call to another WLAN having a coverage area that can support the call via the PDA 105, if such WLAN exists and if this option was previously selected by the user. Handoff between WLANs is similar to the standard cellular handoff between two base stations. If the handoff in step 260 succeeds, the call remains active between the PDA 105 and the Wireline Device 180. Otherwise, the hand-over process is initiated in step 300 (See FIG. 3).

Figure 3:
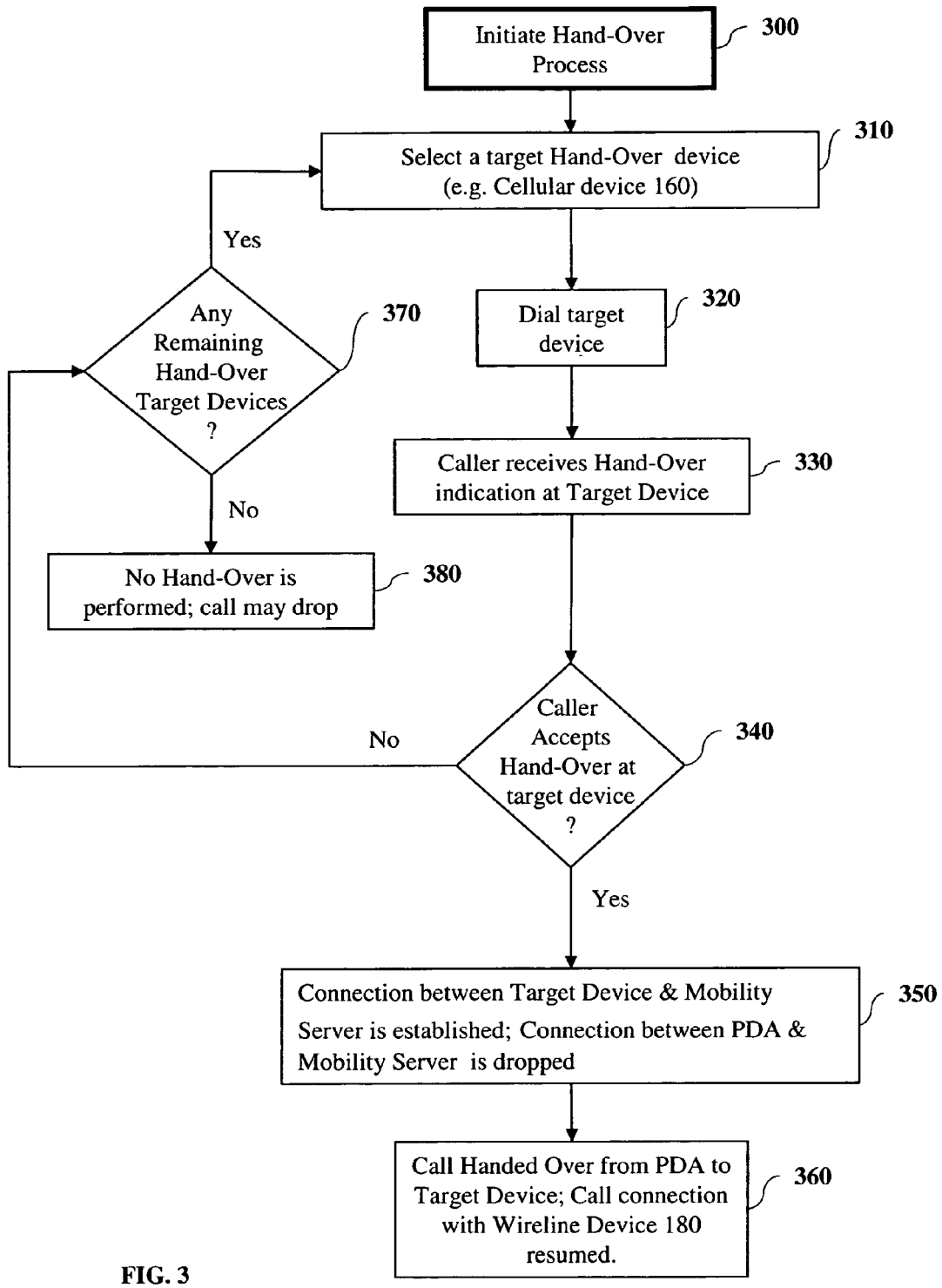
FIG. 3 is a flow chart showing an exemplary hand-over between a WLAN device and a non-WLAN device according to an illustrative embodiment of the present invention.

FIG. 3 illustrates the steps involved in initiating the hand-over process according to an exemplary embodiment of the present invention. As indicated in FIG. 2, in one embodiment this process is initiated if re-establishing call connection was not successful and handoff was not successful or available. As shown in FIG. 3, the hand-over process starts in step 300. In step 310, the Mobility Server 150 selects one of the previously defined alternate target devices (e.g. Cellular Device 160) and user profile. Several devices and user profiles may be defined in order of preference.

In step 320, the target hand-over device is dialed. When dialed, the target hand-over device responds by ringing, vibrating, displaying visual indication or the like in step 330.

In step 340, if the WLAN user answers the incoming call at the target device (e.g., Cellular Device 160), then in step 350 connection between Wireline Device 160 and Mobility Server 150 is established and connection between the PDA 105 and the Mobility Server 130 is dropped. Thus, in step 360, Communication Server 130 completes the trunk links between the Wireline Device 180 and the Cellular Device 165, thus resuming the original call between the PDA 105 and the Wireline Device 180.

During the hand-over process, which in some implementations can take up to two seconds for example, the other party (e.g. Wireline Device 180) receives a message from the Mobility Server 150 indicating, e.g., that the call will be reconnected momentarily, or another advisory. According to another embodiment of the present invention, music or other user defined announcements can be alternatively played to the caller on the Wireline Device 180.

If in step 340 the call is not answered at Cellular Device 165 (e.g. due to lack of response by the user or cellular network un-availability), the Mobility Server 150 determine if other target hand-over devices are assigned at step 370. If other target devices are defined, the process starts again at step 310 and continues until a successful hand-over can occur. If hand-overs to all specified target devices are unsuccessful, no hand-over is performed and the call may be terminated as shown in step 380.

The present invention also provides a method and an apparatus for handing over calls from Cellular Device 160 to PDA 105 when the cellular caller enters the WLAN coverage area.

A WLAN user who is registered at the Mobility Server 150 and who is engaged in a cellular telephone call using Cellular Device 160 will receive a notification at PDA 105 when entering the WLAN coverage area, indicating that the call can be carried over the WLAN and can be received at PDA 105. According to the present invention, the notification received at the WLAN device can be in the form of a visual indicator, sound indicator or both or any other form (e.g., vibration). If the cellular user desires to receive the call at PDA 105, the Mobility Server 150 will facilitate the hand-over from the Public Cellular Network 165 to the WLAN 100.

According to one embodiment of the present invention, the Mobility Server 150 receives WLAN network information, such as available bandwidth, and utilizes such information in determining the timing of the hand-over from or to the WLAN device. Furthermore, call priorities can be used to decide when a WLAN call needs to be transferred to a non-WLAN. Thus, the present invention permits the utilization of the RF signal strength or desired call Quality of Service for the WLAN call or a cellular call to determine the optimal time for handing over the call.

The present invention is not limited by the number of callers participating in the handed over call (e.g., it can be a three way call or a conference call). Nor is any limit to the number of hand-overs that can be performed during a call.

The Mobility Server 150 also insures that the telephony features of the original call (e.g. call waiting, voice mail, conference, hold, transfer, abbreviated dialing, three way calling) are maintained after the hand-over, if the target device and target network can support these features. Thus, user feature preferences are maintained through the hand-over process.

In FIG. 1, PDA 105 is shown to be distinct from the Cellular Device 160. However, the present invention does not preclude the use of a device in which PDA 105 and Cellular Device 160 are the same device, e.g., a PDA/Cellular Device combination that provides connectivity to the WLAN and is able to engage in VoIP calls, and at the same time, is capable of making cellular telephone calls. In such a case, the call hand-over would be to the same device, albeit on a different network.

Furthermore, such a combination device capable of hand-over to itself can, e.g., use two different telephone numbers in order to access the WLAN and the Cellular Network.

The present invention will also allow users to perform on-demand hand-overs for an active call, regardless of the status of the data link or the RF signal strength. The forced hand-overs are accomplished, for example, by entering an access code and the telephone number of the hand-over target device.

The present invention is not limited to hand-overs between WLAN and cellular networks or vice versa. It is applicable to other hand-overs between any type of network, e.g. wireline or cordless, and is not limited to any specific cellular communication technology or protocols (e.g. TDMA, CDMA, GSM, UMTS, W-CDMA) or a WLAN version of the standards.

Other alternative embodiments or implementations according to the various teachings of the present invention will be understood by whose skilled in the art and are achieved without departing from the spirit and scope of the invention. It is therefore intended that the present invention is not limited to the disclosed embodiments described herein but should be defined in accordance with the claims that follow.

We claim:

1. A method for handing over an active call between a first call device and a second call device comprising the steps of:
    defining a set of target hand-over devices with a mobility server;
    automatically detecting call hand-over threshold for said first call device, automatically initiating hand-overs responsive to detecting said threshold and monitoring said first call device for on-demand hand-over overrides, wherein at least one of said first call device and said set of target hand-over devices supports wireless local area network (WLAN) communications and said on-demand hand-over overrides include halting automatic hand-overs and forcing hand-overs;
    selecting said second call device from the previously defined said set of target hand-over devices responsive to automatic detection of said call hand-over threshold, wherein selection of said second call device is manually selectable from said first device; and
    establishing a connection to said second call device upon acceptance of said call by said second call device.

2. The method of claim 1 wherein said first call device is a non-WLAN device.

3. The method of claim 2 wherein said non-WLAN device is a cellular telephone and said method further comprises maintaining connection to hand-over calls after handing over.

4. The method of claim 3, wherein said non-WLAN cellular telephone device uses 3G air interface technology.

5. The method of claim 3, wherein said non-WLAN cellular telephone device uses TDMA air interface technology.

6. The method of claim 3, wherein said non-WLAN cellular telephone device uses GSM air interface technology.

7. The method of claim 3, wherein said non-WLAN cellular telephone device uses COMA air interface technology.

8. The method of claim 3, wherein said non-WLAN cellular telephone device uses UMTS technology.

9. The method of claim 2 wherein said non-WLAN device is an office wireline telephone.

10. The method of claim 1 wherein said first call device is a WLAN device connected to a first WLAN and before initiating a call hand-over to said second device, said method further comprises:
    attempting a handoff of said first call device to a second WLAN; and whenever an attempted said handoff is successful,
    returning to automatically detecting said call hand-over threshold.

11. The method of claim 10 wherein said WLAN device is a Personal Digital Assistance (PDA).

12. The method of claim 1 wherein said first call device supports both WLAN and non-WLAN communications.

13. The method of claim 1 wherein said second call device supports both WLAN and non-WLAN communications.

14. The method of claim 1 wherein said first call device and said second call device are the same.

15. The method of claim 1 wherein said first call device and said second call device are integrated as a single call device.

16. The method of claim 1, wherein said method further comprises the step of dialing the telephone number of said second call device after selecting said second call device.

17. The method of claim 1 further comprising the step of disconnecting said call from first call device after establishing said connection to said second call device.

18. The method of claim 1, wherein said hand-over threshold is reached when said call loses Internet Protocol connectivity.

19. The method of claim 1 wherein said hand-over threshold is determined based on Radio Frequency signal strength of the active call.

20. The method of claim 1, wherein said hand-over is performed on-demand prior to reaching said hand-over threshold responsive to an on-demand hand-over override from said first call device.

21. The method of claim 20, wherein a user access code is used to perform said on-demand hand-over override.

22. The method of claim 20, wherein a user access code is used to select telephony features for transfer from said first call device to said second call device.

23. The method of claim 1 wherein said call remains active after the hand-over is complete.

24. The method of claim 1 wherein one or more hand-overs are performed per call.

25. The method of claim 1, wherein user associated personalized settings and telephony features are handed over with each said hand-over.

26. The method of claim 1, wherein said call hand-over threshold is determined based on available resources in network of said target device.

27. The method of claim 1 wherein said call hand-over threshold is determined based on at least one of call priority or desired call Quality of Service of said call.

28. An apparatus for handing over an active call between a first call device and second call device, said apparatus comprising:
    a user interface for pre-selecting a set of target hand-over devices, at least one of said first call device and said set of target hand-over devices supporting wireless local area network (WLAN) communications;
    a detector circuit that detects hand-over threshold for said call;
    a selector indicator that automatically selects said second call device from said set of target hand-over devices and automatically initiates hand-overs to selected second call devices;
    an on-demand hand-over override selectively overriding said detector circuit responsive to manual input on said first device, said selector indicator further determining whether to halt an automatic hand-over or to select said second call device and hand-over responsive to said on-demand hand-over override; and
    a mobility server that provides said set of target hand-over devices for pre-selection to said user interface and establishes a connection to said target device upon acceptance of said call by said target device.

29. The apparatus of claim 28 wherein said first call device is a non-WLAN device and said mobility server maintaining connection to hand-over calls after handing over.

30. The apparatus of claim 28 wherein said first call device is a WLAN device and said selector indicator selects when said WLAN device hands over to a non-WLAN device responsive to wireless local area network information and call priorities.

31. The apparatus of claim 28, wherein said user interface sets hand-over targets and preferences.

32. The apparatus of claim 31, wherein said user interface is provided via a dial up connection.

33. The apparatus of claim 31, wherein said user interface is provided via a personal computer.

34. The apparatus of claim 28 further comprising a voice prompt generator for notifying other call party when said hand-over is in progress.

35. The apparatus of claim 28 wherein said first call device and said second call device are the same.

* * * * *